United States Patent
Ito et al.

(10) Patent No.: US 9,377,053 B2
(45) Date of Patent: Jun. 28, 2016

(54) ROLLING BEARING DEVICE

(71) Applicant: NTN CORPORATION, Osaka (JP)

(72) Inventors: Hiroyoshi Ito, Mie (JP); Kaoru Oomoto, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/422,413

(22) PCT Filed: Aug. 12, 2013

(86) PCT No.: PCT/JP2013/071759
§ 371 (c)(1),
(2) Date: Feb. 19, 2015

(87) PCT Pub. No.: WO2014/030559
PCT Pub. Date: Feb. 27, 2014

(65) Prior Publication Data
US 2015/0240872 A1    Aug. 27, 2015

(30) Foreign Application Priority Data

Aug. 20, 2012    (JP) .................................. 2012-181557

(51) Int. Cl.
*F16C 33/66*    (2006.01)
*F16N 7/32*    (2006.01)
*F16C 41/00*    (2006.01)

(52) U.S. Cl.
CPC ........... *F16C 33/6659* (2013.01); *F16C 33/664* (2013.01); *F16C 33/6674* (2013.01); *F16N 7/32* (2013.01); *F16C 41/004* (2013.01)

(58) Field of Classification Search
CPC .................................. F16C 33/6637–33/6692
See application file for complete search history.

(56) References Cited

U.S. PATENT DOCUMENTS

| 5,080,195 A * | 1/1992 | Mizumoto | .......... F16C 33/6622 184/104.1 |
| 2005/0252722 A1* | 11/2005 | Kosugi | ................. B23Q 11/122 184/5.1 |

(Continued)

FOREIGN PATENT DOCUMENTS

| EP | 1 538 357 | 6/2005 |
| EP | 2 757 278 | 7/2014 |

(Continued)

OTHER PUBLICATIONS

Notification Concerning Transmittal of International Preliminary Report on Patentability (IPROP) issued Mar. 5, 2015 in International (PCT) Application No. PCT/JP2013/071759, together with IPROP.

(Continued)

*Primary Examiner* — Thomas R. Hannon
(74) *Attorney, Agent, or Firm* — Wenderoth, Lind & Ponack, L.L.P.

(57) ABSTRACT

A rolling bearing device has an oil supply unit which includes: a lubrication oil tank with a discharge port of a lubrication oil; a pump which sucks the lubrication oil from the lubrication oil tank and discharges the lubrication oil; and an electric power source section for driving the pump. The oil supply unit is disposed inside the rolling bearing or inside a spacer which is placed adjacent to the rolling bearing, and the pump is operated intermittently. The electric power source section for driving the pump includes: a power generator section which generates power by temperature difference between inner and outer rings in the rolling bearing; and a charging section which stores the electric power from the power generator section. The pump is driven when a voltage in the charging section attains a driving voltage for the pump.

4 Claims, 7 Drawing Sheets

(56) References Cited

U.S. PATENT DOCUMENTS

2006/0165328 A1   7/2006   Ueno et al.
2009/0148087 A1*  6/2009   Suzuki .................. F16C 19/163
                                                    384/462

FOREIGN PATENT DOCUMENTS

| JP | 2002-257294 | 9/2002 |
| JP | 2004-108388 | 4/2004 |
| JP | 2005-90713  | 4/2005 |
| JP | 2005-180629 | 7/2005 |
| JP | 2012-102803 | 5/2012 |
| WO | 2005/061914 | 7/2005 |
| WO | 2012/063695 | 5/2012 |

OTHER PUBLICATIONS

Notification of Transmittal of Translation of the International Preliminary Report on Patentability (IPROP) issued Mar. 5, 2015 in International (PCT) Application No. PCT/JP2013/071759, together with translation of IPROP and Written Opinion.

International Search Report (ISR) issued Nov. 5, 2013 in International (PCT) Application No. PCT/JP2013/071759.

Extended European Search Report issued Apr. 15, 2016 in corresponding European Application No. 13831513.0.

* cited by examiner

ROLLING BEARING DEVICE

TECHNICAL FIELD

The present invention relates to rolling bearing devices used in machine tools, industrial machinery, etc., and particularly to a rolling bearing device constituted as a combination of a rolling bearing and an oil supply unit.

BACKGROUND ART

A rolling bearing device which incorporates an oil supply unit therein is conventional (see JP 2004-108388A). In this rolling bearing device, an oil supply unit is mounted on an inner diameter surface of one of two mutually opposed track rings of the rolling bearing, or a fixed-side track ring in this case. The oil supply unit includes a lubrication oil tank which stores lubrication oil; a pump which pumps out the lubrication oil stored in the lubrication oil tank into the bearing; and an electric power generator which drives the pump. The device also includes means which controls the pump in accordance with bearing conditions thereby controlling an amount of discharged oil.

JP 2005-180629A discloses a rolling bearing device, which is loaded with grease therein. A lubrication oil of the same kind as the base oil of the grease is stored in a spacer adjacent to the rolling bearing. The lubrication oil inside the spacer is supplied to inside of the rolling bearing by means of capillary action.

However, the arrangement such as disclosed in JP 2005-180629A, that lubrication oil inside the spacer is supplied to inside of the rolling bearing by capillary action, often results in excessive supply of the lubrication oil.

Also, the lubrication oil stored in the spacer is consumed quickly, posing a problem that stable, long-term supply of lubrication oil is impossible.

SUMMARY OF THE INVENTION

It is therefore an object of the present invention to provide a rolling bearing device which is capable of supplying lubrication oil to the rolling bearing stably for a long time.

Solution to Problem

In order to solve the problems described above, the present invention provides a rolling bearing device including an oil supply unit which has: a lubrication oil tank with a discharge port of a lubrication oil; a pump which sucks the lubrication oil from the lubrication oil tank and discharge the lubrication oil; and an electric power source section for driving the pump. The oil supply unit is disposed inside a rolling bearing or inside a spacer which is placed adjacent to the rolling bearing, and the pump is operated intermittently.

Since the pump is operated intermittently, excessive supply of the lubrication oil can be avoided and stable supply of the lubrication oil for a long term is achieved.

In order to operate the pump intermittently, the electric power source section for driving the pump may include, for example: a power generator section which generates power by way of temperature difference between an inner and an outer rings in the rolling bearing; and a charging section which stores the electric power from the power generator section; and with this arrangement, the pump is driven when a voltage in the charging section attains a pump driving voltage.

As another arrangement, the pump maybe driven to perform the first supply of the lubrication oil after the voltage in the charging section is held for a predetermined time since the voltage in the charging section attains the pump driving voltage.

Also, there may be an arrangement that a cycle of charging to and discharging from the charging section is repeated for a plurality of times before the pump is driven to perform the first supply of the lubrication oil.

Further, there may be an arrangement that an operation interval of the pump is controlled by a timer for holding the voltage in the charging section for a predetermined time in accordance with an operation time of the rolling bearing after the first supply of the lubrication oil is performed by driving the pump.

Still further, the pump operation interval may be controlled by changing a number of times for which the cycle of charging to and discharging from the charging section is repeated, in accordance with an operation time of the rolling bearing.

Advantages of the Invention

According to the present invention, the pump is operated intermittently, whereby excessive supply of the lubrication oil is avoided, and stable, long-term supply of the lubrication oil is achieved.

DESCRIPTION OF EMBODIMENTS

Hereinafter, embodiments of the present invention will be described based on the attached drawings.

Figure 1:
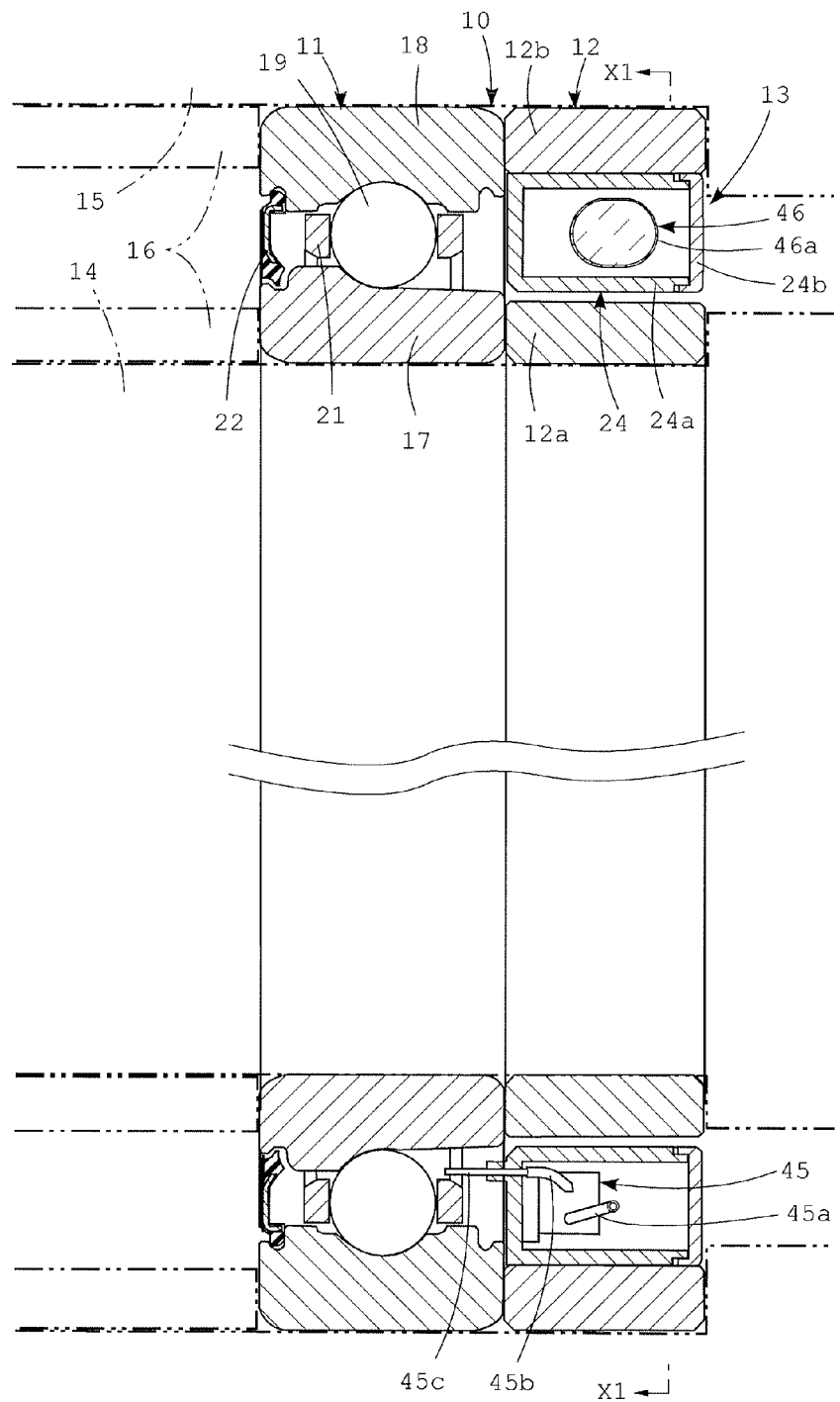
FIG. 1 is a sectional view taken in lines A-A in FIG. 3.
Figure 2:
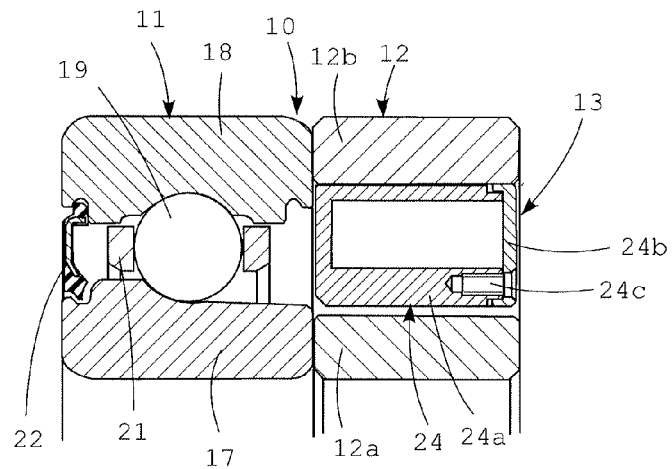
FIG. 2 is a partial sectional view taken in lines B-B in FIG. 3.
Figure 3:
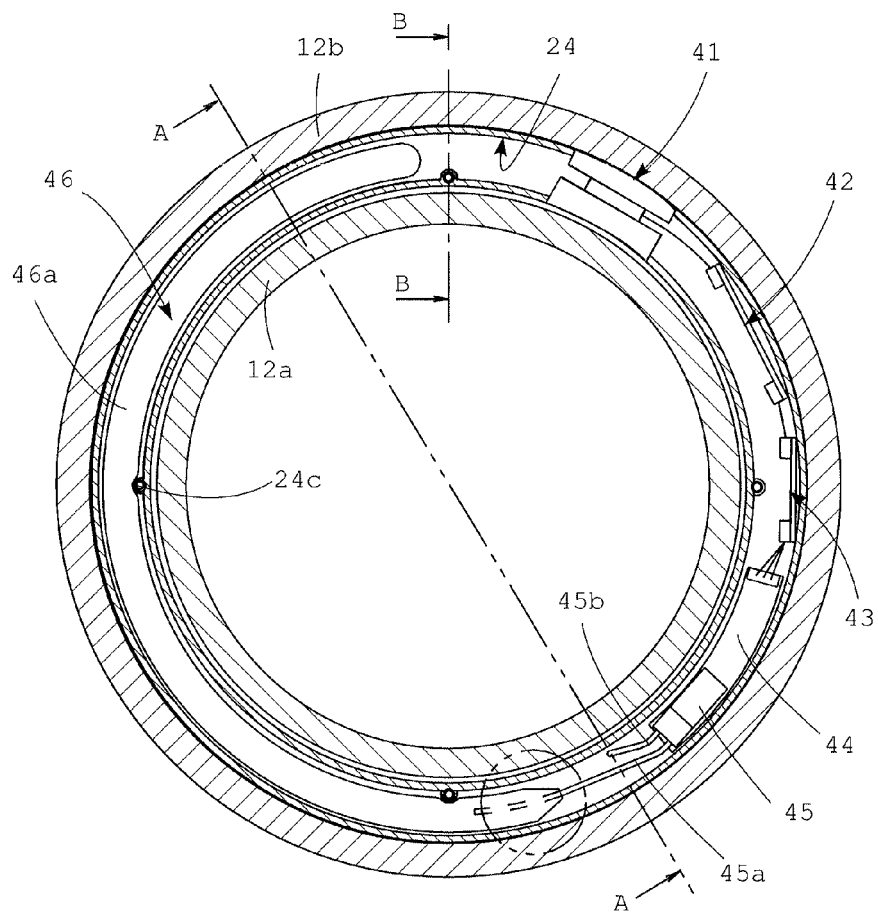
FIG. 3 is a sectional view of an oil supply unit taken in lines X1-X1 in FIG. 1.

A rolling bearing device 10 according to an embodiment shown in FIG. 1 through FIG. 3 includes a rolling bearing 11; a spacer 12 press-contacted onto an axial end of the rolling bearing; and an oil supply unit 13 incorporated in the spacer 12; and when used, is assembled into a space between a rotation shaft 14 and a housing 15. The rolling bearing 11 has another end, on which another spacer 16 is press-contacted.

These two spacers 12, 16 provide axial positioning of the rolling bearing 11. The rotation shaft 14 in this embodiment is horizontal.

The rolling bearing 11 may be provided by whichever of an angular contact ball bearing and a deep groove roller bearing, and includes an inner ring 17, which is a rotation-side track ring; an outer ring 18 on a fixed side; a predetermined number of rolling elements 19 placed between these track rings; and a retainer 21 which keeps a predetermined distance between the rolling elements 19. The rolling bearing 11 is pre-packed with desirable grease, and a seal plate 22 is attached to an end on the spacer 16 side.

The spacer 12 includes an inner-ring-side spacer 12a and an outer-ring-side spacer 12b. The inner-ring-side spacer 12a is fitted in and fixed to the rotation shaft 14 side, and is press-contacted onto an end surface of the inner ring 17. The outer-ring-side spacer 12b is fitted in and fixed to an inner diameter surface of the housing 15, and is press-contacted onto an end surface of the outer ring 18. The other spacer 16 is also fitted in and fixed to the rotation shaft 14 side and the housing 15 side in the same fashion, and is press-contacted onto the other end surfaces of the inner ring 17 and of the outer ring 18.

As shown in FIG. 3, the oil supply unit 13 includes an annular housing 24 and various components housed therein in a circumferential direction. The components include a power generator section 41, a charging section 42, a controller section 43, a driving section 44, a pump 45, a lubrication oil tank 46, etc.

As shown in FIG. 2, the annular housing 24 of the oil supply unit 13 is constituted by a housing main body 24a which has a generally U-shaped section with an open end facing away from the rolling bearing 11; and a lid 24b which closes the open end of the housing main body 24a and is detachable from/attachable to the housing main body 24a. The housing main body 24a and the lid 24b are made of the same thermally plastic resin material such as PPS.

The lid 24b of the housing 24 is fixed to the housing main body 24a with screws 24c. By unscrewing the screws 24c and removing the lid 24b, it becomes possible to replenish the lubrication oil tank 46 inside the housing main body 24a, with lubrication oil without removing the entire oil supply unit 13.

The housing main body 24a has its outer circumferential surface adhesively fixed to an inner diameter surface of the outer-ring-side spacer 12b. The adhesive for fixing the housing main body 24a may be provided by epoxy resin for example.

Figure 4:
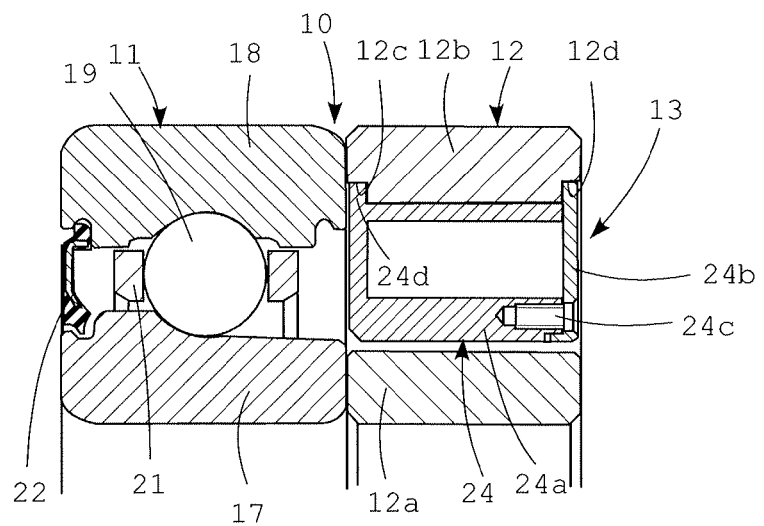
FIG. 4 is a sectional view of a housing of the oil supply unit as another embodiment.

FIG. 4 shows an embodiment in which the housing 24 is fixed without using an adhesive, to the inner diameter surface of the outer-ring-side spacer 12b.

In this example in FIG. 4, a pair of recesses 12c, 12d receding in a radially outward direction are formed on both axial sides of an inner diameter surface of the outer ring-side spacer 12b; the housing main body 24a has an outer diameter surface on the rolling bearing 11 side, where there is formed a ridge 24d to fit into the recess 12c, and this ridge 24d is fitted into the recess 12c; the other recess 12d is fitted by an outer diameter portion of the lid 24b which is fixed to the housing main body 24a with screws 24c, so that the lid 24b is screw-fixed to the housing main body 24a by the screws 24c. Thus, the inner diameter surface of the outer ring-side spacer 12b is sandwiched by the ridge 24d of the housing main body 24a and the outer diameter portion of the lid 24b, thereby fixing the housing 24 to the inner diameter surface of the outer ring-side spacer 12b, without using an adhesive.

Next, the lubrication oil tank 46 which is incorporated inside the housing main body 24a is provided by a bag 46a of an elastic resin, and is disposed in an arcuate form along the annular housing 24.

Figure 5:
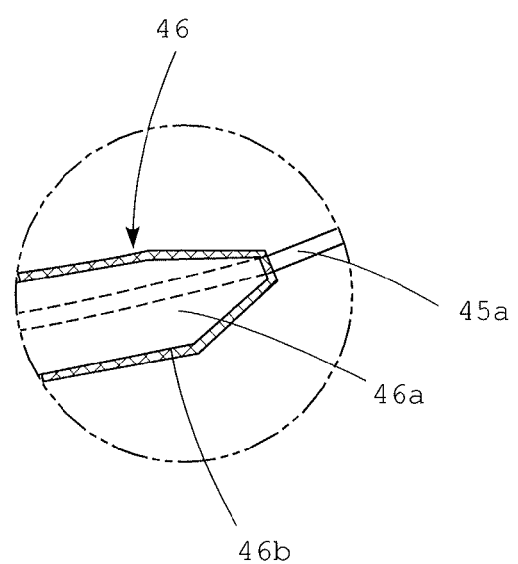
FIG. 5 is an enlarged view of a bag which is shown circled by an alternate long and two short dashes line in FIG. 3.

As shown in an enlarged view in FIG. 5, the plastic bag 46a is, for example, made of a resin film, by placing a sheet of the resin film on another, and then thermally welding their perimeters. In FIG. 5, a reference symbol 46b indicates the thermally welded region.

The bag 46a is provided with a suction tube 45a which leads to the pump 45. The suction tube 45a is integrated with the bag 46a by sandwiching the tube between two films of resin for forming the bag 46a and then performing the thermal welding to complete the bag 46a.

Figure 6:
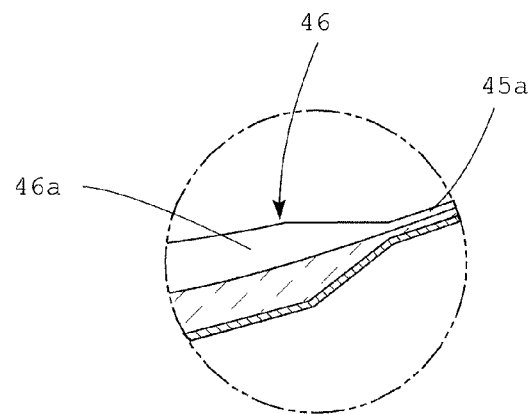
FIG. 6 is a partially cut-out enlarged view of a bag according to another example of the one shown circled by an alternate long and two short dashes line in FIG. 3.

FIG. 6 shows a bag 46a which is formed by blow molding. When the bag 46a is formed by blow molding, a suction tube 45a may be blow-formed integrally with the bag 46a.

Desirably, however, the bag 46a of the lubrication oil tank 46 formed by blow molding should receive a flattening process to flatten a bag portion since the bag portion is bulged as it is formed in the blow molding process. By altering the shape of the bag to a flat shape, the bag becomes possible to discharge lubrication oil completely even after the amount of the lubrication oil has become small. This way, it is possible to completely consume the lubrication oil stored in the bag 46a.

The bag 46a which constitutes the lubrication oil tank 46 can be formed of such a material as nylon, polyethylene, polyester and polypropylene; there is no specific limitation to the material as far as the material is not attacked by lubrication oil stored in the bag 46a.

The suction tube 45a which is provided in the bag 46a of the lubrication oil tank 46 is preferably detachable from the pump 45. The suction tube 45a which is detachable from the pump 45 allows the suction tube 45a to be removed from the pump 45 for replenishing lubrication oil from the suction tube 45a into the bag 46a when lubrication oil level becomes low in the lubrication oil tank 46.

Also, the bag 46a which is detachable from the pump 45 allows such a replacement system that lubrication oil is loaded in a replacement bag 46a, and when there is no more lubrication oil left in the original bag 46a, then the used bag 46a is taken out and is replaced with the replacement bag 46a. In this way, replenishing lubrication oil can be finished within a short time. Since the replacement bag 46a can be loaded with lubrication oil under a controlled environment in the lubrication oil manufacturer, it is possible to reduce such a risk as foreign matter inclusion in the bag 46a at the time of loading oil. It should be noted here that a lid should desirably be placed to the suction tube 45a of the replacement bag 46a in order to prevent foreign matter inclusion during storage.

Lubrication oil which is loaded in the lubrication oil tank 46 desirably has a viscosity of VG22 for example, since an excessively high viscosity will bear too much burden on the pump and the power source.

Figure 7:
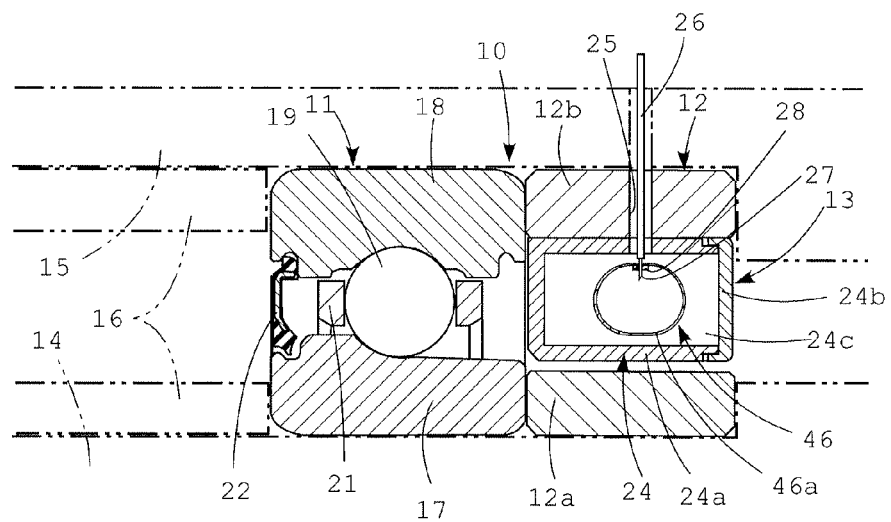
FIG. 7 is a sectional view showing an embodiment where lubrication oil is externally replenishable to a lubrication oil tank of an oil supply unit.

Next, FIG. 7 shows another embodiment. In this embodiment, there is no need for removing the bag 46a out of the housing 24 or removing the lid 24b when replenishing the bag 46a of the lubrication oil tank 46 with lubrication oil. In other words, it is possible to fill the bag 46a with lubrication oil from outside while the bag 46a stays inside the housing 24.

As shown in FIG. 7, a through-hole 25 is made radially, from an outer circumferential surface of the housing 15 in which the rolling bearing device 10 is installed, to inside of the housing 24 in the oil supply unit 13. When replenishing lubrication oil, a lubrication oil syringing needle 26 is inserted through the through-hole 25 into the bag 46a inside the housing 24, to fill the bag 46a with the lubrication oil. A lubrication oil injection port 28 which is made of a highly elastic rubber is provided at a place in the bag 46a where lubrication oil syringing needle 26 is inserted so that insertion/removal of a needle tip 27 of the lubrication oil syringing needle 26 will not cause leakage of lubrication oil.

The housing 15 in which the rolling bearing device 10 is installed, the spacer 12, the radial through-hole 25 made in the housing 24 of the oil supply unit 13, and the lubrication oil injection port 28 in the bag 46a are circumferentially aligned with each other at the time of assembling.

In each of the embodiments described thus far, the annular housing 24 houses, the power generator section 41, the charging section 42, the controller section 43, the driving section 44, the pump 45, etc. in its circumferential direction, in addition to the lubrication oil tank 46.

Figure 8:
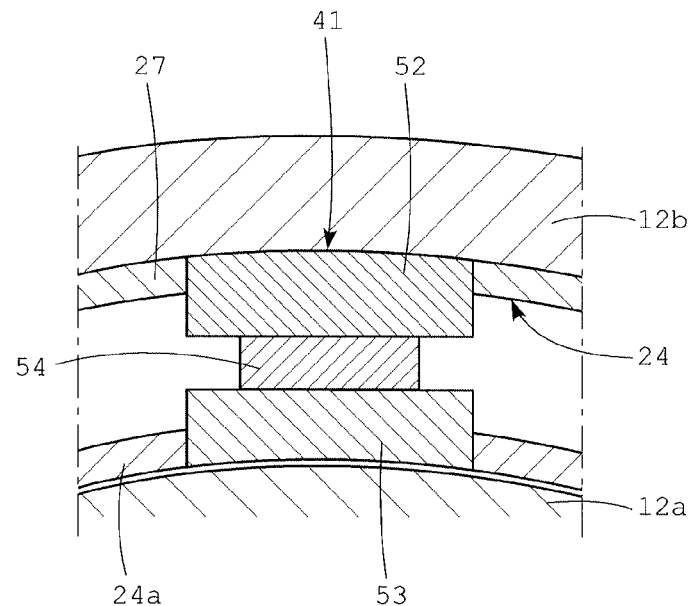
FIG. 8 is an enlarged sectional view showing an example of an electric power source of an oil supply unit.

As shown in FIG. 8, the power generator section 41 may be provided by, for example, an element which generates electric power by way of Seebeck effect. When the rolling bearing device 10 is operating, temperature of the inner ring 17 and the outer ring 18 increases due to heat caused by friction with the rolling elements 19 (see FIG. 1). In general configuration, the outer ring 18 is assembled into the housing 15 of the machine it serves, and therefore loses heat by thermal conduction, resulting in temperature difference between the inner ring 17 and the outer ring 18. Different temperatures conducted to the respective heat conductors 52, 53 causes the Seebeck element 54 to have temperature difference between its two end surfaces, causing the element to generate electric power according to Seebeck effect.

When using the above configuration where heat conductors 52, 53 are provided to penetrate the inner circumferential surface and the outer circumferential surface of the housing main body 24a respectively and a Seebeck element 54 is placed between these heat conductors 52, 53, an adhesive having good heat conductivity should desirably be used on a surface where the heat conductor 52 which penetrates the outer circumferential surface of the housing main body 24a makes contact with the inner diameter surface of the outer ring-side spacer 12b. It should be noted here that the heat conductor 52 which is on the outer ring-side has its outer diameter equal to an inner diameter of the outer ring spacer 12b and is fitted thereto for improved heat radiation. On the other hand, the heat conductor 53 which is on the inner ring side has its inner diameter not in contact with the inner ring spacer 12a. If possible, it is desirable that the outer ring-side and the inner ring-side heat conductors 52, 53 have the same volume.

Preferably, thermal grease, for example, should be applied between the inner diameter surface of the outer-ring-side spacer 12b and the heat conductor 52; between the heat conductor 52 and the Seebeck element 54; and between the Seebeck element 54 and the inner-ring-side heat conductor 53, for improved contact and heat conductivity. Thermal grease generally contains silicone as a primary ingredient. The heat conductors 52, 53 should be made of a metal which has a high heat conductivity rate. For example, silver, copper, gold, etc. are good candidates, among which copper is the most common due to cost reasons. In addition, copper alloys which contain copper as a primary ingredient can also be used. Further, sintered alloys containing copper as a primary ingredient are also usable.

Electric charge generated by the power generator section 41 is stored in the charging section 42 which is provided by a storage battery, condenser, etc. If a condenser is employed, an electric double layer condenser (capacitor) is desirably used.

Figure 9:
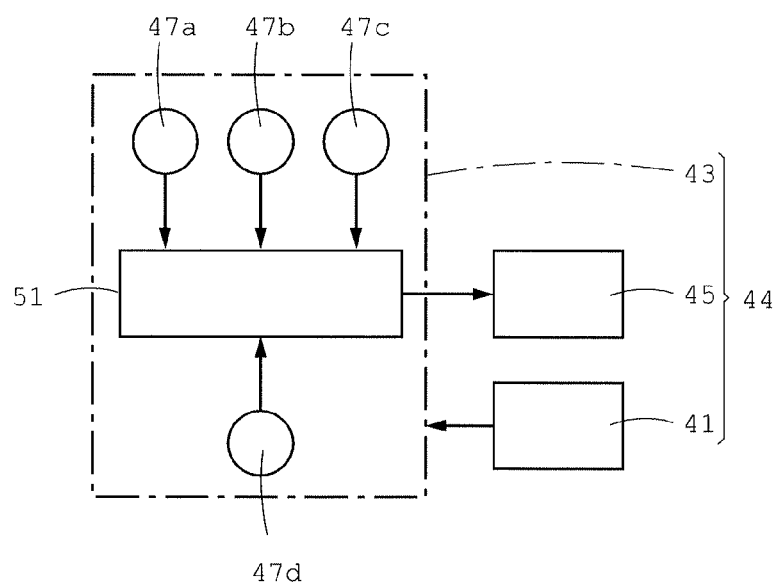
FIG. 9 is a detailed block diagram of a driving section.

As shown in FIG. 9, the controller section 43 has sensors such as a bearing temperature sensor 47a, a bearing rotation sensor 47b, a lubricant remaining quantity sensor 47c, and a lubrication oil temperature sensor 47d. Signals from these sensors are inputted to a CPU 51, which then automatically controls the pump 45 in accordance with temperature and rotation status of the rolling bearing 11, thereby controlling the amount of lubrication oil supply.

The pump 45 has a suction tube 45a which sucks lubrication oil from the lubrication oil tank 46; and a discharge tube 45b from which the sucked lubrication oil is discharged. The discharge tube 45b has a discharge nozzle 45c at its tip, from which lubrication oil is supplied to between the fixed-side track ring and the rotation-side track ring of the rolling bearing 11.

Although the pump 45 can be driven whenever the electric power stored in the condenser of the charging section 42 has attained a predetermined voltage, it is desirable that the following interval is utilized for extended lubrication life of the rolling bearing 11 which has grease sealed therein, and for extended operation hours between maintenance services.

Figure 10:
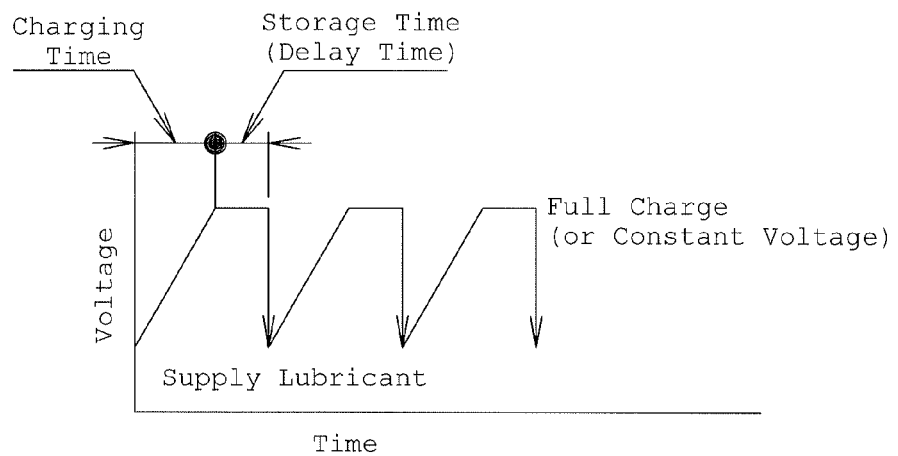
FIG. 10 shows a relationship between power charge to a charging section and lubrication oil supply interval.

For example, as shown in FIG. 10, in cases where charging time of the charging section 42 to attain a required voltage for driving the pump 45 is shorter than a required lubrication oil supply timing, a predetermined charging time (delay time) is added to extend the lubrication oil supply interval even after a full-charge state.

Figure 11:
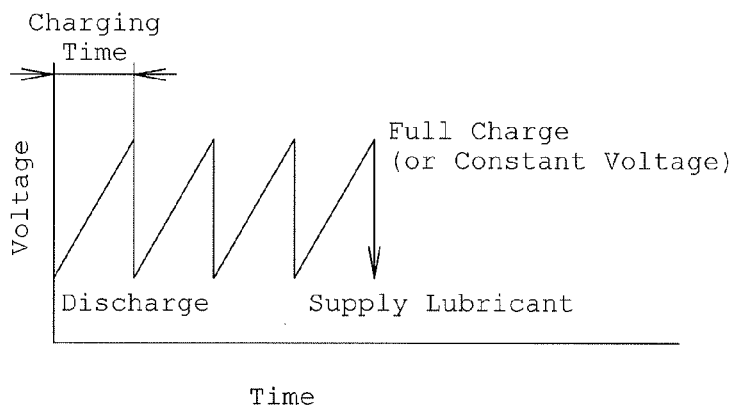
FIG. 11 shows a relationship between power charge to the charging section and lubrication oil supply interval.

As another example for extending lubrication oil supply interval, FIG. 11 shows an arrangement that the charging section 42 repeats a cycle of discharging its voltage once the voltage reaches a predetermined level, then being re-charged and thereafter discharging again upon achieving the predetermined voltage, until a sufficiently long lubrication oil supply interval is achieved.

Figure 12:
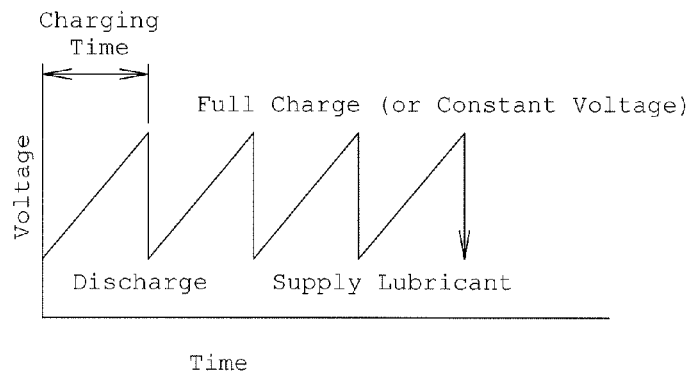
FIG. 12 shows a relationship between power charge to the charging section and lubrication oil supply interval.

Since the power generator section 41 makes use of temperature difference in the rolling bearing 11 for generation of the electric power, the amount of generated power will increase when there is a large temperature difference, i.e., when the inner ring 17 of the rolling bearing 11 has a high temperature, and this in turn shortens the charging time to the charging section 42. On the contrary, when the inner ring 17 of the rolling bearing 11 has a low temperature, the temperature difference is small, and the amount of generated power is small, and this in turn extends the charging time to the charging section 42. FIG. 11 shows a case in which the inner ring 17 of the rolling bearing 11 has a higher temperature difference and the charging time is shorter than in the case in FIG. 12, whereas FIG. 12 shows a case in which the inner ring 17 of the rolling bearing 11 has a smaller temperature difference and the charging time is longer.

As described, the lubrication oil supply interval varies depending on the temperature difference of the inner ring 17 of the rolling bearing 11.

Generally, a long lubrication oil supply interval is acceptable if the rolling bearing 11 has favorable internal lubrication conditions and there is only a small temperature increase inside the rolling bearing 11, whereas a short lubrication oil supply interval is desirable if the rolling bearing 11 does not have very good internal lubrication conditions because such conditions cause a large temperature increase inside the rolling bearing 11.

This means that the arrangement which makes use of temperature differences in the rolling bearing 11 for power generation provides an advantage that the lubrication oil supply interval changes automatically depending on the load born by the rolling bearing 11 whereby internal lubrication conditions of the rolling bearing 11 are always maintained favorably.

In an arrangement as described as the above where temperature difference in the rolling bearing 11 is utilized for power generation, there can be a case where power generation efficiency is too good and the charging time is too short. In such a case, the stored voltage may be discharged to, e.g., a resister upon attaining a predetermined voltage value, thereby providing a time interval in the operation timing of the pump 45. In this case, there is a cycle(s) of charging and discharging before the pump 45 is operated. The number of this charge-discharge cycles can be used in controlling the operation interval of the pump 45. As another example, a timer function may be triggered when the power storage voltage is reached a predetermined value, to provide an interval in the operation cycle of the pump 45. In this case, the above-described charge-discharge cycle is not repeated.

Figure 13:
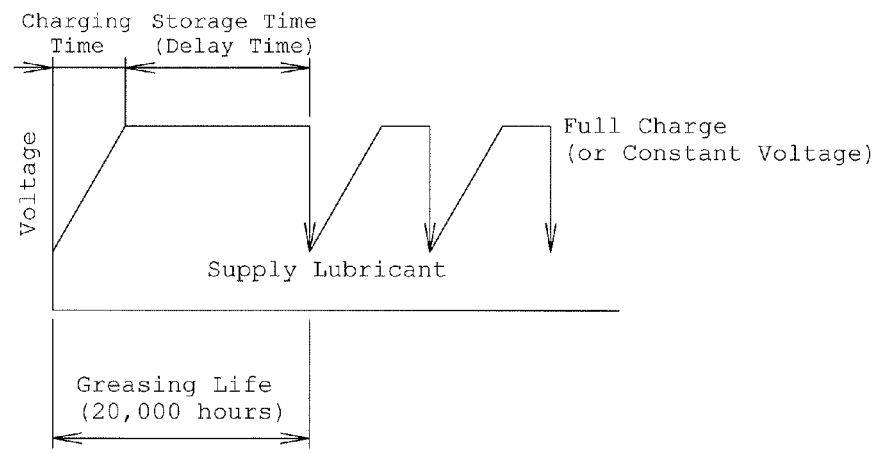
FIG. 13 shows a relationship between power charge to the charging section and lubrication oil supply interval.

In cases where the rolling bearing 11 is provided by a grease-sealed type, the grease sealed inside the rolling bearing 11 provides sufficient lubrication during an initial operation period. Therefore, as shown in FIG. 13, there may be an arrangement for these, that the first supply of the lubrication oil is started after the grease inside the rolling bearing 11 has ended its greasing life (e.g. 20,000 hours). Delaying the first supply of the lubrication oil as described, prolongs the life of the rolling bearing 11, and prolongs the time to maintenance.

The suction tube 45a, which is connected to the suction side of the pump 45, extends into the lubrication oil tank 46 to suck lubrication oil stored in the lubrication oil tank 46.

On the other hand, the discharge tube 45b which is connected to the discharge side has its tip connected to a discharge nozzle 45c for discharging lubrication oil into the rolling bearing. It is desirable that the discharge nozzle 45c has its tip disposed at a location between the inner and the outer rings of the bearing, closely to the inner ring's outer circumferential surface. The discharge nozzle 45c has a nozzle hole of an appropriate inner diameter based on a relationship between surface tension due to base oil viscosity and the amount of discharge.

It should be noted here that the above embodiment is an example of inner ring rotation. Also, it has a horizontal rotation axis; however, the axis may be vertical. Further, it may be incorporated in a machine tool spindle.

REFERENCE SIGN LIST

10 Bearing Device
11 Rolling Bearing
12 Spacer
12a Inner Ring Side Spacer
12b Outer Ring Side Spacer
12c, 12d Recesses
13 Oil Supply Unit
14 Rotation Shaft
15 Housing
16 Spacer
17 Inner Ring
18 Outer Ring
19 Rolling Element
21 Retainer
22 Seal Plate
24 Housing
24a Housing Main Body
24b Lid
24c Screw
24d Ridge
25 Through-Hole
26 Lubrication Oil Syringing Needle
27 Needle Tip
28 Lubrication Oil Injection Port
41 Power Generator Section
42 Charging Section
43 Controller Section
44 Driving Section
45 Pump
45a Suction Tube
45b Discharge Tube
45c Discharge Nozzle
46 Lubrication Oil Tank
46a Bag
46b Thermally Welded Region
47a through 47d Sensors
51 CPU
52, 53 Heat Conductors
54 Seebeck Element

The invention claimed is:

1. A rolling bearing device comprising:
a rolling bearing having an inner ring and an outer ring; and
an oil supply unit including:
  a lubrication oil tank having a lubrication oil discharge port;
  a pump for sucking lubrication oil from the lubrication oil tank and discharging the lubrication oil; and
  an electric power source section for driving the pump;
wherein the oil supply unit is disposed inside one of the rolling bearing or a spacer adjacent to the rolling bearing, the pump being configured to operate intermittently;
wherein the electric power source section for driving the pump includes:
  a power generator section for generating power by way of a temperature difference between the inner ring and the outer ring of the rolling bearing; and
  a charging section for storing the electric power from the power generator section;
wherein the pump and the electric power source are configured such that the pump is driven to supply the lubrication oil when a voltage in the charging section attains a pump driving voltage; and
wherein the pump and the electric power source are configured such that the pump is driven to perform a first supply of the lubrication oil after the voltage in the charging section is held for a predetermined time after the voltage in the charging section attains the pump driving voltage.

2. A rolling bearing device comprising:
a rolling bearing having an inner ring and an outer ring; and
an oil supply unit including:
  a lubrication oil tank having a lubrication oil discharge port;
  a pump for sucking lubrication oil from the lubrication oil tank and discharging the lubrication oil; and
  an electric power source section for driving the pump;
wherein the oil supply unit is disposed inside one of the rolling bearing or a spacer adjacent to the rolling bearing, the pump being configured to operate intermittently;
wherein the electric power source section for driving the pump includes:
  a power generator section for generating power by way of a temperature difference between the inner ring and the outer ring of the rolling bearing; and
  a charging section for storing the electric power from the power generator section;
wherein the pump and the electric power source are configured such that the pump is driven to supply the lubrication oil when a voltage in the charging section attains a pump driving voltage; and wherein a cycle of charging to and discharging from the charging section is repeated for a predetermined number of times before the pump is driven to perform a first supply of the lubrication oil.

3. A rolling bearing device comprising:

a rolling bearing having an inner ring and an outer ring; and an oil supply unit including:
- a lubrication oil tank having a lubrication oil discharge port;
- a pump for sucking lubrication oil from the lubrication oil tank and discharging the lubrication oil; and
- an electric power source section for driving the pump;

wherein the oil supply unit is disposed inside one of the rolling bearing or a spacer adjacent to the rolling bearing, the pump being configured to operate intermittently;

wherein the electric power source section for driving the pump includes:
- a power generator section for generating power by way of a temperature difference between the inner ring and the outer ring of the rolling bearing; and
- a charging section for storing the electric power from the power generator section;

wherein the pump and the electric power source are configured such that the pump is driven to supply the lubrication oil when a voltage in the charging section attains a pump driving voltage; and wherein an operation interval of the pump is controlled by a timer for holding the voltage in the charging section for a predetermined time in accordance with an operation time of the rolling bearing after a first supply of the lubrication oil is performed by driving the pump.

4. A rolling bearing device comprising:

a rolling bearing having an inner ring and an outer ring; and an oil supply unit including:
- a lubrication oil tank having a lubrication oil discharge port;
- a pump for sucking lubrication oil from the lubrication oil tank and discharging the lubrication oil; and
- an electric power source section for driving the pump;

wherein the oil supply unit is disposed inside one of the rolling bearing or a spacer adjacent to the rolling bearing, the pump being configured to operate intermittently;

wherein the electric power source section for driving the pump includes:
- a power generator section for generating power by way of a temperature difference between the inner ring and the outer ring of the rolling bearing; and
- a charging section for storing the electric power from the power generator section;

wherein the pump and the electric power source are configured such that the pump is driven to supply the lubrication oil when a voltage in the charging section attains a pump driving voltage; and wherein an operation interval of the pump is controlled by changing a number of times for which a cycle of charging to and discharging from the charging section is repeated, in accordance with an operation time of the rolling bearing.

\* \* \* \* \*